United States Patent [19]
Oates

[11] 3,960,534
[45] June 1, 1976

[54] METHOD OF ASSEMBLING A LIQUID CRYSTAL CELL

[75] Inventor: William Lee Oates, Bernardsville, N.J.

[73] Assignee: RCA Corporation, New York, N.Y.

[22] Filed: Apr. 29, 1974

[21] Appl. No.: 464,762

[52] U.S. Cl. ......................................... 65/43; 65/58; 141/1; 141/8; 156/109; 350/160 LC; 428/34
[51] Int. Cl.² .................... B32B 3/02; C03C 27/00; E06B 3/24
[58] Field of Search ...................... 156/109; 161/45; 141/18, 48, 63, 92; 428/24; 350/160 LC; 65/43, 42, 58

[56] References Cited
UNITED STATES PATENTS

| | | | |
|---|---|---|---|
| 3,097,061 | 7/1963 | Woelk | 156/109 X |
| 3,305,123 | 2/1967 | Nordby | 156/109 X |
| 3,527,663 | 9/1970 | Rose et al. | 161/45 |
| 3,573,149 | 3/1971 | Tibble et al. | 161/45 |
| 3,701,368 | 10/1972 | Stern | 141/8 X |
| 3,799,651 | 3/1974 | Janning | 141/1 X |
| 3,807,833 | 4/1974 | Graham et al. | 350/160 LC |
| 3,814,501 | 6/1974 | Schindler | 350/160 LC |
| 3,862,830 | 1/1975 | Stern | 65/43 X |

*Primary Examiner*—Philip Dier
*Attorney, Agent, or Firm*—Glenn H. Bruestle; Birgit E. Morris

[57] ABSTRACT

In a cell comprising a pair of oppositely disposed, flat substrates, and an edge seal maintaining the substrates in spaced apart relation, a fabrication process in which the two substrates are disposed in oppositely disposed relation and in contact with a glass frit bead disposed therebetween, and spacer plates are disposed between the substrates between the bead and the edges of the substrates. The glass bead is heat softened and the two substates forced towards one another against the bead until further inward movement is prevented by contact of the substrates with the spacer plates.

2 Claims, 6 Drawing Figures

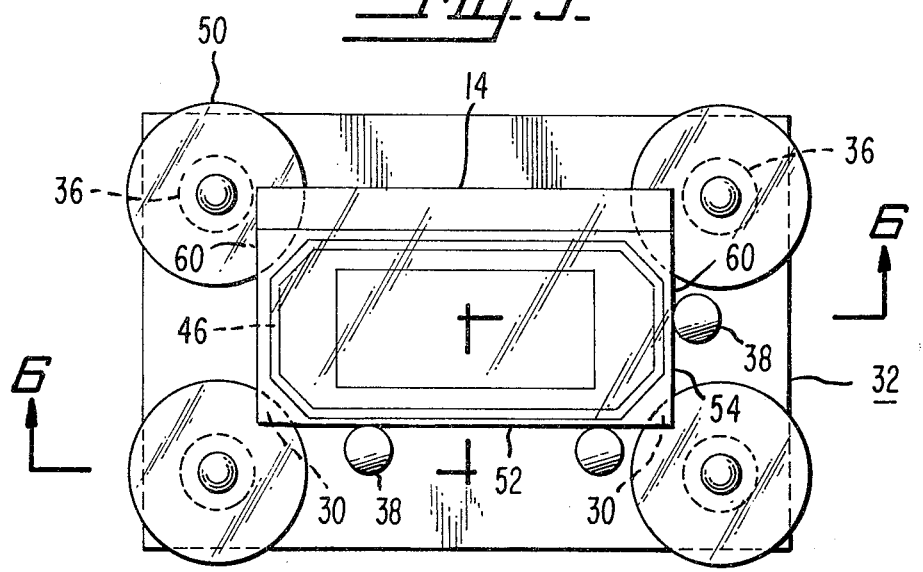
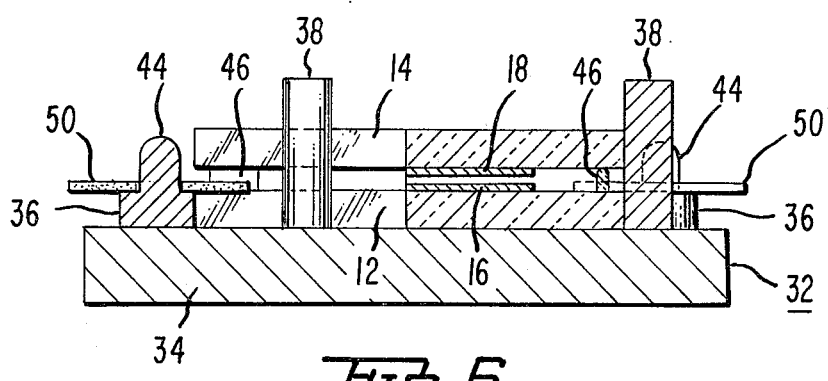

METHOD OF ASSEMBLING A LIQUID CRYSTAL CELL

This invention relates to liquid crystal devices, and particularly to a method of fabrication thereof.

One form of liquid crystal device includes a cell comprising a pair of oppositely disposed, spaced apart, flat substrates, electrodes on the inner or facing surfaces of the substrates, and a liquid crystal material sandwiched therebetween. The edges of the substrates are sealed together by a glass seal.

The spacing between the flat substrates is quite small, being in the order of 1 mil, and the spacing tolerance is quite critical with respect to proper operation of the device.

One means heretofore used to control the spacing between the substrates is the use of dimensionally rigid, tiny spacer plates of, for example, mica. In the fabrication of the cell, one of the substrates is provided with a raised bead of glass frit disposed along the edges of the substrate, the tiny spacer plates are disposed on the substrate inwardly of the bead from the substrate edge, and the other substrate is disposed on the first substrate, the two substrates being spaced apart by the height of the glass frit bead.

The sub-assembly is heated to soften the bead, and compressive pressure is applied to force the substrates together to collapse the bead until further inward movement of the substrates is prevented by contact thereof with the rigid spacer plates. The cell is then cooled to fuse the collapsed bead, the fused bead providing the substrate edge seal, and the spacer plates being sealed within the cell. A liquid crystal material is then injected into the space between the substrates through a port through one of the substrates, and the port is then hermetically sealed.

Difficulties with this process are that the spacer plates are quite small and thus somewhat difficult to grasp and accurately place on the substrate. Also, owing to the small mass of the spacer plates, they occasionally become misplaced on the substrate during handling of the sub-assembly prior to the sealing operation. Since the spacer plates are disposed within the enclosed space of the cell, misplacement thereof occasionally interferes with the flow of, and the complete filling of the cell by the liquid crystal materia. Also, during the cell filling operation, the spacer plates tend to trap air within the cell which gradually forms bubbles within the cell during the life thereof. This is undesirable. Moreover, the presence of the spacer plates within the cell limits the available viewing area of the device.

In the drawings:

FIG. 5 is a view similar to that of FIG. 3 but showing a fully loaded jig; and

FIG. 6 is a cross-sectional view taken along line 6—6 of FIG. 5.

Figure 1:
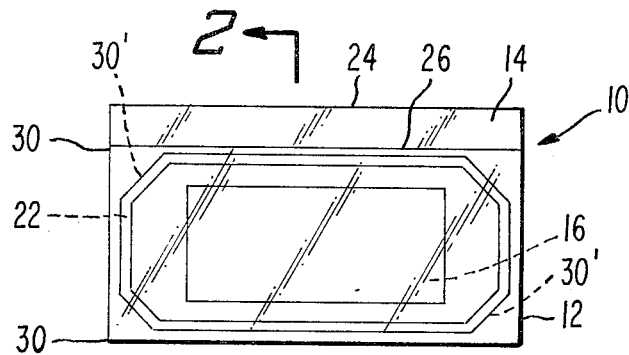
FIG. 1 is a plan view of a liquid crystal cell made in accordance with the instant invention.
Figure 2:
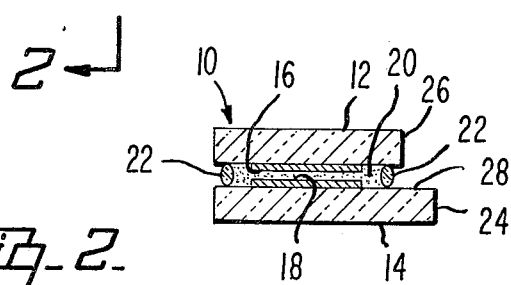
FIG. 2 is a cross-sectional view taken along line 2—2 of FIG. 1.

With reference to FIGS. 1 and 2, a liquid crystal cell 10 made in accordance with the instant invention comprises a pair of oppositely disposed, spaced apart, rectangular, flat substrates 12 and 14, usually of glass, oppositely disposed electrodes 16 and 18 on the inside surfaces of the substrates, a film 20 of a liquid crystal material between the substrates, and a glass seal or joint 22 disposed between the substrates along edges thereof providing, along with the substrates, an hermatic enclosure for the liquid crystal film 20. An edge 24 of the substrate 14 extends beyond the edge 26 of the substrate 12 thereby exposing a portion of the inside surface 28 of the substrate 14. Conductive path means, not shown, electrically connected to each of the electrodes 16 and 18, extend onto the exposed surface portion, and terminal means, not shown, are electrically connected to the paths for making electrical contact with the electrodes.

To the extent so far described, liquid crystal cells of the type shown are well known, an example of such a cell and further description of means used to electrically connect to the cell electrodes being provided in U.S. Pat. No. 3,689,131 issued Sept. 5, 1972, and assigned to the RCA Corporation. Also, various ones of known liquid crystal materials can be used in the cell 10.

The glass seal 22 cuts diagonally across the corners 30 of the substrate 12 thereby leaving a space or gap, exterior to the seal 22, between the substrates 12 and 14 at those corners. The purpose of this is described hereinafter.

Figure 3:
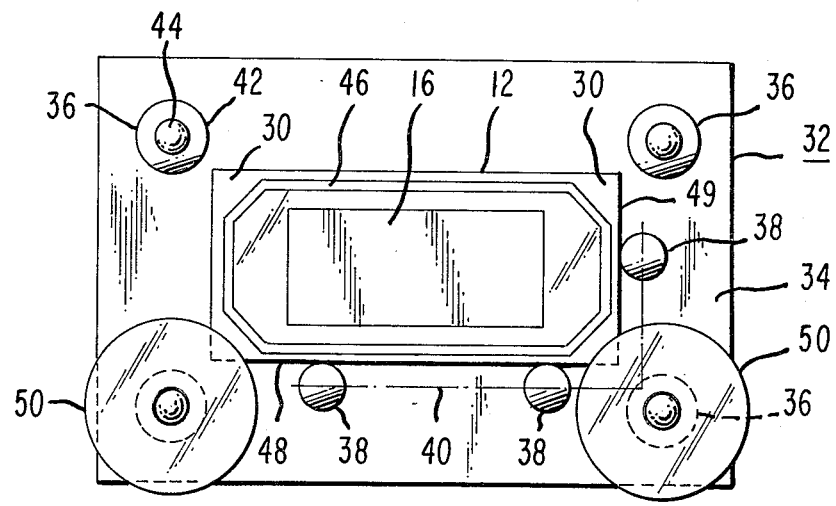
FIG. 3 is a plan view of partly loaded jig used in the practice of the instant invention.
Figure 4:
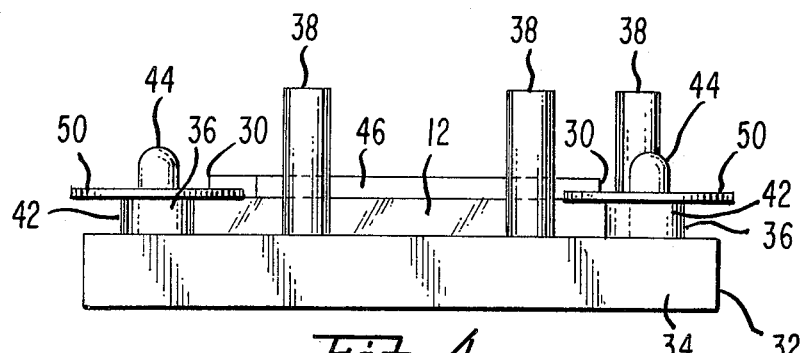
FIG. 4 is a side view of the jig shown in FIG. 3.

In the assembly of the cell 10, a jig 32 of the type shown in FIGS. 3 and 4 is used. The jig 32 comprises a bottom flat plate 34 having a set of four upright posts 36 mounted thereon at the corners of a rectangle, and a set of three upright pins 38, the centers of which are disposed along a right angle as indicated by the dash-dot line 40. The pins 38 are simple right circular cylinders. The posts 36 comprise a circular flange 42 and an upstanding right circular cylindrical peg 44 mounted centrally thereon.

In the assembly of the cell 10, the substrate 12 (FIG. 3) is first provided with a bead 46 of a sealing material, e.g., a known glass frit commonly used for sealing together glass members. The bead 46 can be provided by known techniques such as, for example, silk screening a glass frit slurry onto the substrate and heating the substrate to drive off the slurry solvent. In one embodiment, for example, the bead 46 has a height of 3 mils (0.076mm), and a base width of 25 mils (0.635mm). As shown in FIG. 3, the bead 46 has the same shape, relative to the corners 30 of the substrate 12, as the seal 22 in the finished cell, as shown in FIG. 1.

The substrate 12 is disposed, bead 46 up (FIGS. 3 and 4), on the plate 34 of the jig 32 with the edges 48 and 49 (FIG. 3) of the substrate 12 pressed against the pins 38. This provides accurate positioning of the substrate relative to the jig. As shown, the corners 30 of the substrate 12 are disposed closely adjacent to the jig posts 36.

Annular spacer plates 50 of a thickness equal to the desired spacing between the substrates 12 and 14 in the finished cell (e.g., in the order of 1 mil, or 0.025mm) are then dropped onto each of the posts 36 (only two spacer plates 50 being shown in FIG. 3) in overlapped relation with the corners 30 of the substrate 12, the overlapping portions of the spacer plates 50 being spaced from and outside the bead 46 on the substrate. The spacer plates 50 rest on the flanges 42 of the jig posts 36, the flanges 42 having a thickness, i.e., a height above the surface of the jig plate 34, substantially equal to the thickness of the substrate 12 (e.g., 40 mils, or about 1mm). Thus, the spacer plates 50 are substantially parallel to the flat inner surface of the substrate 12.

In one embodiment, for example, the spacer plates 50 have an outer diameter of 312 mils (7.9mm) an inner diameter of 62 mils (1.57mm), and fit relatively loosely on the post pegs 44 which have a diameter of about 60 mils (1.52mm), and a height of 35 mils (0.89mm). As shown in FIG. 3, only a small portion of each spacer plate 50 overlaps the substrate 12. This is desirable for a reason described hereinafter.

The spacer plates 50 are of a material that is dimensionally stable and chemically inert under the pressures and temperatures used in the later sealing process, described hereinafter, and are preferably transparent for a reason to be described. Mica is a preferred material since, among other things, it can be readily cleaved to extremely thin, flat sheets. Other materials such as carbon and stainless steel can also be used.

The other substrate 14 is then disposed on the jig 32 (FIGS. 5 and 6) with the edges 52 and 54 thereof pressed against the pins 38, the substrate 14 thereby being accurately positioned relative to the jig 32 and to the other substrate 12, the two electrodes 16 and 18 on the substrates also thus being aligned with one another. As shown in FIG. 6, the substrate 14 contacts and rests on the bead 46 on the substrate 12, the thickness of the spacer plates 50 generally being substantially less than the height of the bead 46. Also, as shown in FIG. 5, corners 30 of the substrate 14 overlap portions of the spacer plates 50.

The two substrates 12 and 14 can be pressed against the pins 38 by suitable spring means, not shown, or most simply, and preferably, the loaded jig 32 can be mounted in a carrier, not shown, so that the plate 34 of the jig is held in a generally vertical but backwardly tilted plane; i.e., so that gravity presses the substrates both against the plate 34 and the pins 34.

The loaded jig is then heated at a temperature (e.g., in the order of 500°C) to soften the bead 46, and owing to the force of gravity, or through the use of suitable springs or weights, not shown, the substrates 12 and 14 are forced towards one another, thus collapsing the softened bead 46 until further inward movement of the substrates towards one another is stopped by contact of both substrates with the spacer plates 50. In one embodiment, weights are used to provide the compressive forces, pressures in order of 70 p.s.i. (4.92kg/cm²) being used.

The bead 46 is then allowed to cool to form the rigid hermetic seal 22 between the substrates.

The sealed cell is then removed from the jig, as by inverting the jig, the apertured spacer members 50 thus dropping off the inverted posts 36.

While being somewhat firmly pressed between the inner surfaces of the substrates 12 and 14, the spacer plates 50 are not sealed to the substrates since they are disposed outside of and out of contact with the seal 22. Thus, the spacer plates can be pulled out from between the substrates and reused. After removal of the spacer plates 50, the spacing between the substrates is maintained by the then rigid seal 22.

While the spacer plates 50 can generally be removed from the cell, as above noted, breakage of the spacer plates does frequently occur, a tiny portion of the spacer plates 50 often remaining between the substrates. Except for the damage done to the otherwise reusable spacer plates 50, however, the presence of the tiny spacer plate portions between the substrates creates no problem, since, being disposed outside the hermetic seal 22, the spacer plate portions do not contact the liquid crystal material later introduced into the cell and cannot adversely affect it. Also, if transparent, the spacer plate portions are hardly noticeable.

As above noted, and shown in FIG. 5, only a comparatively small portion of the spacer plates 50 is disposed between the substrates. This is desirable since only small areas of the cell need be devoted to providing the proper substrate spacing. Conversely, however, relatively large spacer plates 50 can be used which greatly facilitates grasping the spacer plates 50 and mounting them on the jig posts 36. Also, by so mounting the spacer plates 50 onto the jig 32, the spacer plates 50 are held relatively securely in place on the jig and are less subject to be misplaced or lost during handling of the jig prior to the sealing operation.

After the cell has been edge sealed, a liquid crystal material is introduced into the cell through a substrate port, and the port then sealed off, using, for example, a process described in U.S. Pat. No. 3,701,368 issued Oct. 31, 1972, and assigned to the RCA Corporation.

In the finished cell 10, as shown in FIGS. 1 and 2, the seal 22 generally follows the edge contour of the substrate 12, but includes re-entrant portions 30' which are spaced a greater distance from the edges of the substrate 12 than are other portions of the seal 22. This "enlarged" spacing provided by the re-entrant portions 30' is actually quite small, having, in one embodiment, for example, a maximum length of 50 mils (1.25 mm).

What is claimed is:

1. A method of assembling a liquid crystal cell comprising:
    disposing on a first glass substrate having a conductive layer thereon a narrow glass frit strip on said conductive layer substantially parallel to the edges of said first substrate but spaced therefrom and having at least three reentrant portions at intervals which extend to a greater distance from the edges of said first substrate than do the remaining portions of said strip,
    mounting three or more spacer plates in overlapped relation with a portion of said first substrate between the edges of said substrate and said strip at the reentrant portions thereof thereby avoiding contact between said spacer plates and said strip,
    disposing a second glass substrate having a conductive layer thereon on said first substrate such that said conductive layers face each other and said second substrate rests on said glass frit such that all of its edges extend beyond said frit,
    heating the resultant assembly under pressure to melt the frit, thereby forcing the second substrate against the first substrate until both substrates contact said spacer plates to thereby establish a predetermined spacing between said substrates, and
    cooling to provide a rigid seal between said substrates for maintaining said predetermined spacing.

2. The method according to claim 1 wherein said spacer plates are removed after cooling.

* * * * *